3,487,110
N,N'-DI-(2-AMINOBENZOYL)-PHENYL-
ENEDIAMINES
Elmar R. Altwicker, Somerville, and Leo Michaels, Nutley, N.J., assignors to Universal Oil Products Company, Des Plaines, Ill., a corporation of Delaware
No Drawing. Filed Mar. 29, 1967, Ser. No. 626,688
Int. Cl. C07c 103/74, 103/28
U.S. Cl. 260—558    2 Claims

ABSTRACT OF THE DISCLOSURE

Novel N- and N'-(2-aminobenzoyl)-phenylenediamines useful as antiozonants or antioxidants prepared basically by condensing phenylenediamines with isatoic anhydrides.

---

This invention relates to a new class of compounds and to compositions containing such compounds which are stabilized against the deteriorating effects of oxygen or ozone. The novel compounds of the invention may be represented by the following structural formula:

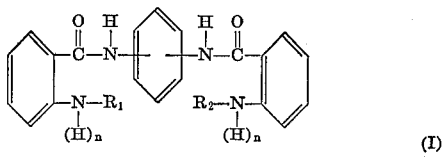

where $R_1$ and $R_2$, independently of each other, are selected from the group consisting of hydrogen, alkyl, cycloalkyl, aralkyl and aryl and $n$ is an integer of 0 or 1. The novel diamide compounds of this invention represented by the above formula find wide application in the chemical field and are especially useful as plasticizers, ingredients of synthetic waxes or resins, precursors for pharmaceuticals or insecticides, or as antiozonants and antioxidants. Of these many uses, however, one of the more valuable present uses for these compounds is the stabilization of compositions against the deteriorating effects of oxygen or ozone. Of significance in this respect is that certain of these compounds, and particularly the compounds of Formula I where the nitrogen atoms on the phenylene ring are in para position and $n$ is 1, are effective in the stabilization of rubbery polymers against oxygen attack.

Accordingly, an object of this invention is to provide a new class of compounds comprising N- and N'-(2-aminobenzoyl)-phenylenediamines. Another object is to provide compositions stabilized against deterioration resulting from the action of oxygen or ozone. These and other objects of this invention will be apparent from the the following further detailed description thereof.

The diamide compounds of this invention represented by Formula I above may be prepared by a wide variety of different reaction schemes. In general, however, the compounds are basically or initially prepared by condensing a phenylenediamine with an isatoic anhydride of the formula:

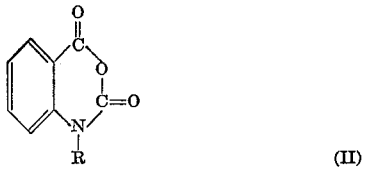

where R has the same significance as $R_1$ or $R_2$ above. This condensation results in the formation of compounds of this invention represented by Formula I above where $R_1$ equals $R_2$ and $n$ is 1. When the Schiff base compounds, that is, where in Formula I $n$ is 0, are desired then the initial condensation is effected with an isatoic anhydride having R as hydrogen and the initial product is subsequently alkylated to form the Schiff base. When compounds are desired where $R_1$ is not equal to $R_2$, then various different preparational procedures may be used. One involves, for example, effecting the condensation in two reaction steps using in each step an isatoic anhydride having a different R group. Also various compounds having different $R_1$ and $R_2$ groups either equal or different may be prepared by using an isatoic anhydride having R as hydrogen in the initial condensation and then further treating the product such as by reductive alkylation to add different $R_1$ and $R_2$ groups.

Of the various phenylenediamines which may be used in the condensation, the preferred compounds are N-unsubstituted para-phenylenediamines. The phenylenediamines may, of course, be ring substituted with various common groups, such as alkyl, halo or alkoxy; examples of which include: o-chloro-p-aminoaniline, m-methyl-p-aminoaniline or m-methoxy-p-aminoaniline. The isatoic anhydride represented by Formula II above used in the condensation reaction, may, as indicated, be N-substituted with an R group. This R group may, of course, become the $R_1$ or $R_2$ group of the compounds of this invention represented by Formula I after condensation with the phenylenediamine and it may be hydrogen; alkyl and preferably alkyl of from 1 to about 16 carbon atoms; cycloalkyl and preferably cycloalkyl of from 5 to about 7 carbon atoms; aralkyl of preferably phenyl substituted alkyl where the alkyl portion may contain from 1 to about 5 carbon atoms; or aryl, preferably phenyl. Examples of the isatoic anhydride of Formula II used in the condensation include: isatoic anhydride, N-methyl isatoic anhydride, N-ethyl isatoic anhydride, N-cyclohexyl isatoic anhydride, N-phenyl isatoic anhydride or N-benzyl isatoic anhydride. It should, of course, be understood that the isatoic anhydride may also be ring substituted with such common groups as halo, alkoxy or alkyl examples of which include 6-chloroisatoic anhydride or N-methyl-6-chloroisatoic anhydride.

In effecting the initial or basic reaction to prepare the compounds of this invention represented by Formula I, where $n$ is 1 and $R_1$ equals $R_2$, by condensing an isatoic anhydride of Formula II with a phenylenediamine, the conditions and procedures used may be widely varied. Generally, however, the conditions and procedures commonly employed in the preparation of amides by the reaction of an amine with an acid anhydride may be satisfactorily used for the preparation. Typically the reaction may be conducted by charging the desired phenylenediamine and isatoic anhydride to a reaction vessel, preferably admixed with a suitable solvent such as an alcohol, for example, ethanol or an ether such as dioxane followed by stirring and heating the reactants for a period of time sufficient to complete the reaction. The temperature used may be varied, but it usually ranges from about 25° to 150° C. or when a solvent is used, preferably at atmospheric refluxing temperature. The time required to effect the condensation will vary depending upon such factors as the particular reactants and the temperature. Usually, however, a reaction period ranging from a few minutes to several hours is sufficient. The ratio of reactants is not important, but where a diamide is desired in the initial condensation, then the isatoic anhydride reactant must be used in a ratio of at least above about two moles per one mol of the phenylenediamine. After the condensation reaction is complete, the desired product may be recovered from the reaction mixture and purified by conventional methods including distillation, extraction and crystallization. When the condensation is to be effected in at least two steps to prepare compounds represented by Formula I where $R_1$ is not the same as $R_2$, then the first condensation is effected according to the above general procedure with the principal difference being that the desired isatoic anhydride is reacted with the phenylenediamine in a molar ratio of substantially one to one. The second step is then substantially a repeat of the first step, with the principal difference being the use of an isatoic anhydride having an R group different from the R group of the isatoic anhydride used in the first condensation. Examples of the compounds of this invention represented by Formula I which may thus be prepared either with $R_1$ being the same as $R_2$ or different, include: N,N'-di - (2 - aminobenzoyl) - p - phenylenediamine, N,N'-di - (2 - methylaminobenzoyl) - m - phenylenediamine, N,N' - di - (2 - cyclohexylaminobenzoyl) - p - phenylenediamine, N,N' - di - (2 - benzylaminobenzoyl) - p - phenylenediamine, N,N' - di - (2 - phenylaminobenzoyl) - p-phenylenediamine, N - (2 - aminobenzoyl) - N' - (2-methylaminobenzoyl) - p - phenylenediamine, N - (2-methylaminobenzoyl) - N' - (2 - ethylaminobenzoyl) - p-phenylenediamine, N - (2 - aminobenzoyl) - N' - (2 - cyclohexylaminobenzoyl) - p - phenylenediamine or N- (2 - aminobenzoyl - N' - (2 - phenylaminobenzoyl) - p-phenylenediamine.

When the Schiff base compounds of the invention, that is the compounds of Formula I where $n$ is 0, are desired, then as indicated previously, the initial condensation is preferably effected with an isatoic anhydride having R as hydrogen. The condensation product represented by Formula I where $n$ is 1 and $R_1$ and $R_2$ are both hydrogen, for example N,N'-di-(2-aminobenzoyl)-phenylenediamine, is then further treated to form the Schiff base. This reaction treatment may be effected according to conventional procedures and involves basically reacting the initial condensation product with a suitable aldehyde or ketone in the presence of a solvent, for example, xylene at atmospheric refluxing temperature for a period of time sufficient to effect the desired reaction. Suitable aldehydes or ketones for this purpose include isobutanal, pentanal, octanal, pentadecanal, benzaldehyde or naphthaldehyde, acetone, 2-pentanone, octanone or nonanone. After the reaction is complete, the desired Schiff base product is recovered from the reaction mixture and purified by conventional means including crystallization or chromatography techniques. Examples of the Schiff base compounds of this invention include: N,N'-di-(2-isobutylideneaminobenzoyl) - p - phenylenediamine, or N,N' - di - (2-benzylideneaminobenzoyl)-p-phenylenediamine.

The Schiff base compounds prepared as above may, if desired, be converted to the corresponding saturated products, that is, where in the compounds of Formula I, $n$ is 1, by reducing the Schiff base in the presence of hydrogen and a reduction catalyst at elevated temperatures and pressure according to conventional procedures. Alternatively, these reduced products may be obtained directly in one step by utilizing reductive alkylation procedures. In effecting such reductive alkylation, the desired aldehyde or ketone is reacted with a compound of this invention represented by Formula I where $n$ is 1 and $R_1$ and $R_2$ are both hydrogen in the presence of a reduction catalyst and hydrogen and, if desired, a solvent. Suitable catalysts for this purpose include Raney nickel, palladium, platinum, platinum-oxide, nickel-platinum, copper or molybdenum as well as mixtures thereof. Elevated temperatures are used and generally range from about 90° to 300° C. in association with elevated hydrogen pressure ranging from 50 to about 3000 pounds per square inch. When the reductive alkylation is complete, the desired product may be recovered from the reaction mixture and purified by conventional procedures.

As hereinbefore indicated, the novel compounds of this invention are particularly useful in stabilizing compositions against the deteriorating effects of oxygen or ozone. The compositions which may be stabilized according to this invention by incorporating these compounds therein, in general, comprise any material which is deleteriously affected by the action of either ozone or oxygen. Examples of these compositions include petroleum products, for example, unsaturated gasolines or lubricating oils; edible fats and oils, for example, linseed oil or lard; polyolefins, for example, polyethylene or polypropylene; olefin copolymers, for example, ethylene and propylene; rubbery polymers including both natural rubber and synthetic rubber, for example, homo-polymers or copolymers of butadiene, isoprene, and similar aliphatic conjugated diolefin hydrocarbons, such as butadienestyrene copolymer rubber, butadiene-vinyl-pyridine copolymer rubber, isobutylene-isoprene copolymer rubber, ethylene-propylene-conjugated diolefin or non-conjugated diolefin terpolymer or polychloroprene.

The compounds of this invention may be added to the above illustrated class of compositions, either individually or in admixture, according to any of the standard procedures commonly used for incorporating antiozonants or antioxidants into polymeric materials. These compositions may also, if desired, contain additional conventional antioxidants or antiozonants which, in combination with the compounds of this invention, may result in the formation of synergistic compositions. The amount of the compounds of this invention added to stabilize the compositions may be widely varied with the particular amount added in any case being dependent upon such factors as the particular composition being stabilized, the particular stabilizing compound or compounds being added, and whether the composition is being stabilized against oxidation or ozonolysis or both. For example, in the instance where rubbery polymers are being stabilized, the amount of the compound added usually ranges from about 0.05 to 10 weight parts per 100 weight parts of the rubber polymer, with from about 0.1 to 5 weight parts per 100 weight parts usually being preferred.

The following examples are cited to illustrate the novel compounds of this invention and the stabilized compositions containing such compounds. They are not, however, intended to limit the broad scope of this invention to the specific compounds and compositions illustrated therein.

EXAMPLE I

N,N'-di-(2-aminobenzoyl)-p-phenylenediamine was prepared by charging 32.6 grams (0.2 mol) of isatoic anhydride, 10.8 grams (0.1 mol) of p-phenylenediamine and 500 milliliters of ethanol to a reaction flask equipped with heating and stirring means. The mixture was heated at reflux temperature for about one hour and then cooled. The pressure was reduced and about one-half of the ethanol was removed by distillation with the resulting formation of a solid precipitate. The precipitate, weighing about 15 grams, was separated from the reaction mixture by filtration, recrystallized from benzene and dimethylformamide to recover the product melting at 290° to 293° C.

EXAMPLE II

N,N'-di-(methylaminobenzoyl) - p - phenylenediamine was prepared by charging a mixture of 35.4 grams (0.2 mol) of N-methylisatoic anhydride, 10.8 grams (0.1 mol) of p-phenylenediamine and 500 milliliters of p-dioxane to a reaction flask equipped with heating and stirring means. The mixture was heated to reflux temperature and maintained thereat for about four hours. After cooling, the p-dioxane solvent was removed by distillation under reduced pressure. The residue crystallized and was recovered to yield 35 grams of product having a melting point of 278° to 288° C.

EXAMPLE III

A compound of this invention was evaluated as an antioxidant as follows:

A natural rubber tread stock of the following recipe

| Ingredient: | Parts by weight |
|---|---|
| Smoked sheet | 100.00 |
| Statex R | 45.00 |
| Zinc oxide | 5.10 |
| Stearic acid | 3.00 |
| Sulfur | 2.50 |
| Santocure | 0.75 |
| Antioxidant additive N,N'-di-(2 - aminobenzoyl)-p-phenylenediamine | 3.00 | was cured for 40 minutes at 140° C. The cured rubber was then cut into test strips and aged for 2 and 7 day periods at 90° C. The strips were then subjected to the following tests, together with blank samples containing no antioxidant and the results are reported in the table above.

TABLE

| | Shore A Hardness | | Ultimate Elongation, percent | | | 200% Modulus, p.s.i. | | | 300% Modulus, p.s.i. | | | Tensile Strength, p.s.i. | | |
|---|---|---|---|---|---|---|---|---|---|---|---|---|---|---|
| Days Aged | 0 | 7 | 0 | 2 | 7 | 0 | 2 | 7 | 0 | 2 | 7 | 0 | 2 | 7 |
| Sample: | | | | | | | | | | | | | | |
| Blank | 63.5 | 62.5 | 475 | 285 | 100 | 1,300 | 1,275 | | 2,340 | | | 4,030 | 2,180 | 390 |
| Additive | 67.0 | 62.5 | 475 | 285 | 125 | 1,230 | 1,365 | | 2,225 | | | 3,760 | 2,230 | 880 |

We claim as our invention:

1. A compound of the formula:

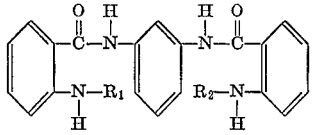

or

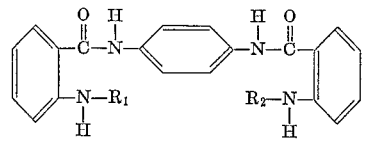

where $R_1$ and $R_2$ are independently selected from the group consisting of hydrogen, methyl, ethyl, cyclohexyl, benzyl and phenyl, not more than one of $R_1$ and $R_2$ being hydrogen.

2. N,N'-di-(2-methylaminobenzoyl) - p - phenylenediamine.

References Cited

UNITED STATES PATENTS 3,242,213  3/1966  Preston et al. _____ 260—558

HENRY R. JILES, Primary Examiner

HARRY I. MOATZ, Assistant Examiner

U.S. Cl. X.R.

252—401; 260—45.9, 814, 107